(12) United States Patent
Rahimzai

(10) Patent No.: US 11,370,480 B2
(45) Date of Patent: Jun. 28, 2022

(54) HYDRAULIC STEERING ARRANGEMENT

(71) Applicant: Danfoss Power Solutions ApS, Nordborg (DK)

(72) Inventor: Abdul Karim Rahimzai, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 447 days.

(21) Appl. No.: 16/595,844

(22) Filed: Oct. 8, 2019

(65) Prior Publication Data
US 2020/0114954 A1    Apr. 16, 2020

(30) Foreign Application Priority Data
Oct. 10, 2018 (DE) .......................... 102018125051.7

(51) Int. Cl.
*B62D 5/065* (2006.01)
*B62D 5/06* (2006.01)
(Continued)

(52) U.S. Cl.
CPC ............ *B62D 5/065* (2013.01); *B62D 5/062* (2013.01); *B62D 5/09* (2013.01); *B62D 5/30* (2013.01)

(58) Field of Classification Search
USPC ........................................................ 180/441
See application file for complete search history.

(56) References Cited

U.S. PATENT DOCUMENTS

| | | | | |
|---|---|---|---|---|
| 9,242,668 B2 * | 1/2016 | Ennemark | .............. | B62D 5/065 |
| 9,550,521 B2 * | 1/2017 | Andersen | .............. | B62D 5/062 |
| 10,625,775 B2 * | 4/2020 | Soerensen | .............. | B62D 5/093 |

FOREIGN PATENT DOCUMENTS

| | | |
|---|---|---|
| CN | 104097686 A | 10/2014 |
| CN | 104159807 A | 11/2014 |

(Continued)

*Primary Examiner* — Kevin Hurley
*Assistant Examiner* — Hosam Shabara
(74) *Attorney, Agent, or Firm* — McCormick, Paulding & Huber PLLC

(57) ABSTRACT

A hydraulic steering arrangement (1) is described comprising a supply port arrangement (P, T) having a pressure port (P) and a tank port (T), a working port arrangement having two working ports (L, R), a main flow path (2) having a main orifice ($A_1$), at least one further orifice ($A_2$, $A_3$, $A_4$) downstream the main orifice ($A_1$), and a measuring motor (3), the main flow path (2) being arranged between the pressure port (P) and the working port arrangement (L, R), a return flow path (4) arranged between the working port arrangement (L, R) and the tank port (T), an amplification flow path (6) having an amplification orifice ($A_U$) and being arranged between the pressure port (P) and the working port arrangement (L, R), and an adjustable pressure source (9) connected to the pressure port (P) and having a load sensing port (18), wherein a main drain orifice ($A_{md}$) is connected between the main flow path (2) downstream the main orifice ($A_1$) and the return flow path (4). It should be possible to operate such a steering arrangement with a dynamic flow. To this end a flow divider (19) connects the load sensing port (18) with the main flow path (2) downstream the main orifice ($A_1$) and the amplification flow path (6) downstream the amplification orifice ($A_U$).

20 Claims, 1 Drawing Sheet

(51) Int. Cl.
*B62D 5/30* (2006.01)
*B62D 5/09* (2006.01)

(56) References Cited

FOREIGN PATENT DOCUMENTS

| | | | |
|---|---|---|---|
| CN | 106143602 | A | 11/2016 |
| EP | 2610138 | A1 | 7/2013 |
| EP | 2786915 | A1 | 10/2014 |

\* cited by examiner

HYDRAULIC STEERING ARRANGEMENT

CROSS-REFERENCE TO RELATED APPLICATIONS

This application claims foreign priority benefits under U.S.C. § 119 to German Patent Application No. 102018125051.7, filed on Oct. 10, 2018, which is hereby incorporated by reference in its entirety.

TECHNICAL FIELD

The present invention relates to a hydraulic steering arrangement comprising a supply port arrangement having a pressure port and a tank port, a working port arrangement having two working ports, a main flow path having a main orifice, at least one further orifice downstream the main orifice, and a measuring motor, the main flow path being arranged between the pressure port and the working port arrangement, a return flow path arranged between the working port arrangement and the tank port, an amplification flow path having an amplification orifice and being arranged between the pressure port and the working port arrangement, and an adjustable pressure source connected to the pressure port and having a load sensing port, wherein a main drain orifice is connected between the main flow path downstream the main orifice and the return flow path.

BACKGROUND

Such a steering arrangement is known, for example, from EP 2 786 915 A1.

In this steering arrangement it is necessary that the main orifice opens before steering of a vehicle equipped with such a steering arrangement can start.

SUMMARY

The object underlying the invention is to enable the steering arrangement to be operated with a dynamic flow.

This object is solved with a hydraulic steering arrangement as described at the outset in that a flow divider connects the load sensing port with the main flow path downstream the main orifice and the amplification flow path downstream the amplification orifice.

In such a hydraulic steering arrangement steering can start already before the main orifice and the amplification orifice open. The load sensing port is used to provide the adjustable pressure source with a pressure information within the arrangement. However, at the same time there is a pressure present in the main flow path and in the amplification flow path, in both flow paths downstream the main orifice or amplification orifice, respectively. Accordingly, when a driver steering a vehicle equipped with such a hydraulic steering arrangement rotates a steering wheel (or actuates another controller) only over a small angle which is not sufficient to open the main orifice and the amplification orifice, there is still the possibility to supply a small flow of hydraulic fluid to the working port arrangement. This flow is called "dynamic flow". This dynamic flow can be used for steering. A flow divider distributes the flow to both the main flow path and to the amplification flow path, so that once the main orifice and the amplification orifice open, there is a smooth transition between the dynamic flow and the full flow from the pressure port.

In an embodiment of the invention the flow divider is connected to a point between the main orifice and the main drain orifice. The main drain orifice can, for example, be connected to the main flow path downstream the main orifice and upstream the further orifice. The pressure from the load sensing port creates a permanent small flow through the main drain orifice. When the main drain orifice is throttled and the main orifice has not yet been opened, this flow can be used to supply hydraulic fluid to the working port arrangement once the further orifice opens.

In an embodiment of the invention an amplification drain orifice is connected between the flow divider and the tank port. This amplification drain orifice has the same effect as the main drain orifice.

In an embodiment of the invention a relation of opening behaviour of the main drain orifice and the amplification drain orifice corresponds to a relation of the opening behaviour of the main orifice and the amplification orifice. When, for example, the amplification orifice has always an area which is twice that of the main orifice, the amplification drain orifice has also an area which is always twice the area of the main drain orifice. Accordingly, the drain orifices and the main orifice or amplification orifice, respectively, are adapted to each other.

In an embodiment of the invention a check valve is arranged in a connection between the flow divider and the main flow path, the check valve opening in a direction away from the flow divider. This check valve counteracts a kick-back from the main flow path.

In an embodiment of the invention a safety valve is arranged in the amplification flow path, said safety valve being loaded in closing direction by a pressure in the main flow path upstream the measuring motor and downstream the main orifice. This safety valve forms a kind of torque compensator and prevents a dangerous situation in case the measuring motor has been jammed or blocked. In this case as soon as the measuring motor has been jammed or blocked, the amplification flow path is blocked or closed accordingly.

BRIEF DESCRIPTION OF DRAWINGS

An embodiment of the invention will now be described in more detail with reference to the drawing, wherein.

DETAILED DESCRIPTION

Figure 1:
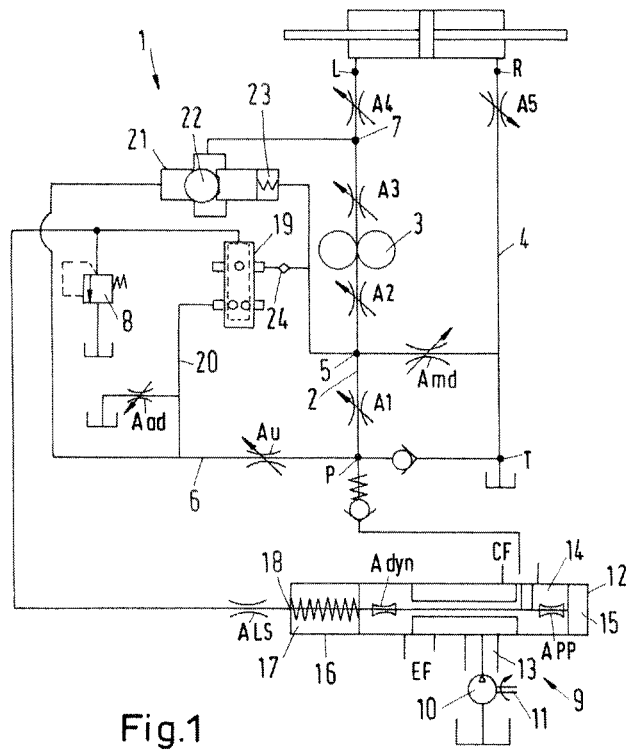
FIG. 1 shows a schematic illustration of a hydraulic steering arrangement.

A hydraulic steering arrangement 1 comprises a supply port arrangement having a pressure port P and a tank port T. Furthermore, the steering arrangement comprises a working port arrangement having a left working port L and a right working port R. A main flow path 2 is arranged between the pressure port P and the working port arrangement L, R. It depends on the direction of steering which of the two working ports L, R is connected to the main flow path 2. The main flow path 2 comprises a main orifice $A_1$ and a measuring motor 3. Furthermore, a first measuring motor orifice $A_2$ is arranged upstream the measuring motor 3 and a second measuring motor orifice $A_3$ is arranged downstream the measuring motor 3.

A return flow path 4 is arranged between the working port arrangement L, R and the tank port. Again, it depends on the direction of steering which of the working ports L, R is connected to the return flow path 4.

Hydraulic fluid passing through the main flow path 2 reaches one of the working ports via a working port orifice $A_4$ and hydraulic fluid returning through the other working port flows through a further working port orifice $A_5$ into the return flow path 4.

A main drain orifice $A_{md}$ is arranged between a point 5 in the main flow path 2, which point 5 is arranged downstream the main orifice $A_1$ and the first measuring motor orifice $A_2$, and the return flow path 4.

The steering arrangement 1 comprises furthermore an amplification flow path 6 having an amplification orifice $A_U$. The amplification flow path 6 is arranged between the pressure port P and the working port arrangement L, R. It is connected to the main flow path 2 at a point 7 between the second flow motor orifice $A_3$ and the working port orifice $A_4$. The working port orifices $A_4$, $A_5$ are dimensioned such that they can take over the combined flow of the main flow path 2 and the amplification flow path 6.

An overpressure valve 8 connects a load sensing line to the tank.

The orifices $A_1$-$A_5$, $A_U$ and $A_{md}$ are formed, for example, in a spool sleeve set in which a spool and a sleeve are arranged rotatably with respect to each other. One of the spool and sleeve is connected to a steering wheel (not shown) and the other is connected to the measuring motor 3. Spool and sleeve together define the mentioned orifices. When the spool is rotated with respect to the sleeve, the main drain orifice $A_{md}$ starts throttling, i.e. the flow area of the main drain orifice $A_{md}$ is decreased. Upon further rotation the orifices $A_1$-$A_5$ and $A_U$ start opening and allow hydraulic fluid to flow from the pressure port P to one of the working ports L, R. This flow drives the measuring motor 3. The measuring motor 3 is operatively connected to the other part of the spool sleeve set which is not connected to the steering wheel and rotates it back to the initial position once the required amount of hydraulic fluid has been supplied to the working port arrangement.

Figure 2:
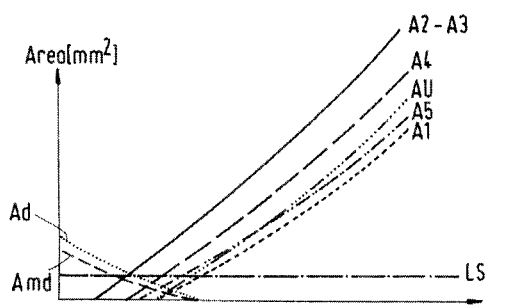
FIG. 2 shows schematically the opening degrees of some orifices of the steering arrangement.

As it can be seen in FIG. 2 the main orifice $A_1$ and the amplification orifice $A_U$ start opening at the same angle of the steering wheel. However, they start opening only after the main drain orifice $A_{md}$ has started throttling.

The function of the opening degree of the amplification orifice $A_U$ depends on the amplification factor which should be obtained by using the amplification flow path 6. As can be seen in FIG. 2 the opening degree of the amplification orifice $A_U$ increases faster than the opening degree of the main orifice $A_1$ meaning that more than 100% of the fluid passing through the main flow path 2 passes through the amplification flow path 6.

The steering arrangement 1 comprises an adjustable pressure source 9. The pressure source 9 comprises a pump 10 which can have a fixed displacement and which is driven by a motor or engine of the vehicle to be steered via a shaft 11.

The pump 10 is connected to a priority valve 12, more precisely to an input 13 of the priority valve 12. The priority valve 12 comprises a piston 14 which is arranged between a pressure chamber 15 and a spring chamber 16. A spring 17 is arranged in the spring chamber 16.

The priority valve 12 comprises a priority output CF and a further output EF.

The priority output CF is connected to the pressure chamber 15 via an orifice $A_{pp}$. It is furthermore connected to the spring chamber 16 via a dynamic orifice $A_{dyn}$. The piston 14 assumes a position in which a force generated by the pressure difference between the pressure chamber 15 and the spring chamber 16 is in equilibrium with the force of the spring 17.

The priority valve 12 comprises a load sensing port 18 which is connected via a load sensing orifice $A_{LS}$ to a flow divider 19. The flow divider 19 is connected to the point 5 in the main flow path 2 and to the amplification flow path 6 via a line 20. An amplification drain orifice $A_{ad}$ connects line 20 to tank.

A safety valve 21 is arranged in the amplification flow path 6. The safety valve 21 comprises a valve element 22, for example in form of a ball, which is loaded in opening direction with the pressure in the amplification flow path 6 and in closing direction by the force of a spring 23 and a pressure at point 5 in the main flow path 2 downstream the main orifice $A_1$.

The main drain orifice $A_{md}$ and the amplification orifice $A_{ad}$ can have the same throttling behaviour when the main orifice $A_1$ and the amplification orifice $A_U$ have the same throttling behaviour as well. However, as in the present case in which the amplification orifice $A_U$ opens faster than the main orifice $A_1$, the amplification drain orifice $A_{ad}$ has a larger opening degree at a steering wheel angle of 0° than the main drain orifice $A_{md}$ so that the flow from the flow divider 19 to the main flow path 2 has the same relation to the flow path through line 20 as the flow through the main flow path 2 and the flow through the amplification flow path 6 once the main orifice $A_1$ and the amplification orifice $A_U$ are open.

The operation of the hydraulic steering arrangement 1 can be described as follows.

As long as the steering wheel is not actuated, the main orifice $A_1$, the amplification orifice $A_U$, the measuring motor orifices $A_2$, $A_3$ and the working port orifices $A_4$, $A_5$ are closed, whereas the main drain orifice $A_{md}$ and the amplification drain orifice $A_{ad}$ are open. Consequently, there is a small flow from the load sensing port 18 of the pressure source 9 to the main flow path 2 and the main drain orifice $A_{md}$ to tank and through the line 20 and the amplification drain orifice $A_{ad}$ to tank as well.

When the steering wheel is rotated by a small angle sufficient to open the measuring motor orifices $A_2$, $A_3$ and the working port orifices $A_4$, $A_5$ but not the main orifice $A_1$ and the amplification orifice $A_U$, the main drain orifice $A_{md}$ and the amplification drain orifice $A_{ad}$ are throttled so that a flow, the so called "dynamic flow" of hydraulic fluid, flows from the load sensing port 18 to the working port arrangement L, R without passing the main orifice $A_1$ and the amplification orifice $A_U$. In this way a "dynamic steering" is possible.

Upon further rotation of the steering wheel the main orifice $A_1$ and the amplification orifice $A_U$ are opened and supply more hydraulic fluid to the working port arrangement L, R. However, since the amplification flow path 6 has been supplied with the dynamic flow via the flow divider 19, transition between the dynamic steering and the "normal" steering is smooth and comfortable for the driver.

Under normal operating conditions, the safety valve 21 remains open since the pressure downstream the amplification orifice $A_U$ is larger than the control pressure at point 5 downstream the main orifice $A_1$. Therefore, part of the hydraulic fluid from the pressure port P to the working port arrangement L, R can pass through the amplification flow path 6.

However, when the main flow path 2 downstream the main orifice $A_1$ is blocked, for example, when the measuring motor 3 is jammed by dirt or the like, the pressure at point 5 increases to become larger or at least equal to the pressure downstream the amplification orifice $A_U$. In this situation, the force of spring 23 is sufficient to move the valve element 22 in a closing position to interrupt a flow through the amplification flow path 6.

A check valve 24 is arranged between the flow divider 19 and the main flow path 2 opening in a direction away from the flow divider 19. This check valve is arranged in the flow path of dynamic flow which has connection with the measuring motor 3 to counteract kick-back.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement (P, T) having a pressure port (P) and a tank port (T), a working port arrangement having two working ports (L, R), a main flow path having a main orifice ($A_1$), at least one further orifice ($A_2$, $A_3$, $A_4$) downstream the main orifice ($A_1$), and a measuring motor, the main flow path being arranged between the pressure port (P) and the working port arrangement (L, R), a return flow path arranged between the working port arrangement (L, R) and the tank port (T), an amplification flow path having an amplification orifice ($A_U$) and being arranged between the pressure port (P) and the working port arrangement (L, R), and an adjustable pressure source connected to the pressure port (P) and having a load sensing port, wherein a main drain orifice ($A_{md}$) is connected between the main flow path downstream the main orifice ($A_1$) and the return flow path, wherein a flow divider connects the load sensing port with the main flow path downstream the main orifice ($A_1$) and the amplification flow path downstream the amplification orifice ($A_U$).

2. The steering arrangement according to claim 1, wherein the flow divider is connected to a point between the main orifice ($A_1$) and the main drain orifice ($A_{md}$).

3. The steering arrangement according to claim 1, wherein an amplification drain orifice ($A_{ad}$) is connected between the flow divider and the tank.

4. The steering arrangement according to claim 3, wherein a relation of opening behaviour of the main drain orifice ($A_{md}$) and the amplification drain orifice ($A_{ad}$) corresponds to a relation of the opening behaviour of the main orifice ($A_1$) and the amplification orifice ($A_U$).

5. The steering arrangement according to claim 1, wherein a check valve is arranged in a connection between the flow divider and the main flow path, the check valve opening in a direction away from the flow divider.

6. The steering arrangement according to claim 1, wherein the main drain orifice ($A_{md}$) and the amplification drain orifice ($A_{ad}$) start throttling before the main orifice ($A_1$) and the amplification orifice ($A_U$) start opening.

7. The steering arrangement according to claim 1, wherein a safety valve is arranged in the amplification flow path, said safety valve being loaded in closing direction by a pressure in the main flow path upstream the measuring motor and downstream the main orifice ($A_1$).

8. The steering arrangement according to claim 2, wherein an amplification drain orifice ($A_{ad}$) is connected between the flow divider and the tank.

9. The steering arrangement according to claim 2, wherein a check valve is arranged in a connection between the flow divider and the main flow path, the check valve opening in a direction away from the flow divider.

10. The steering arrangement according to claim 3, wherein a check valve is arranged in a connection between the flow divider and the main flow path, the check valve opening in a direction away from the flow divider.

11. The steering arrangement according to claim 4, wherein a check valve is arranged in a connection between the flow divider and the main flow path, the check valve opening in a direction away from the flow divider.

12. The steering arrangement according to claim 2, wherein the main drain orifice ($A_{md}$) and the amplification drain orifice ($A_{ad}$) start throttling before the main orifice ($A_1$) and the amplification orifice ($A_U$) start opening.

13. The steering arrangement according to claim 3, wherein the main drain orifice ($A_{md}$) and the amplification drain orifice ($A_{ad}$) start throttling before the main orifice ($A_1$) and the amplification orifice ($A_U$) start opening.

14. The steering arrangement according to claim 4, wherein the main drain orifice ($A_{md}$) and the amplification drain orifice ($A_{ad}$) start throttling before the main orifice ($A_1$) and the amplification orifice ($A_U$) start opening.

15. The steering arrangement according to claim 5, wherein the main drain orifice ($A_{md}$) and the amplification drain orifice ($A_{ad}$) start throttling before the main orifice ($A_1$) and the amplification orifice ($A_U$) start opening.

16. The steering arrangement according to claim 2, wherein a safety valve is arranged in the amplification flow path, said safety valve being loaded in closing direction by a pressure in the main flow path upstream the measuring motor and downstream the main orifice ($A_1$).

17. The steering arrangement according to claim 3, wherein a safety valve is arranged in the amplification flow path, said safety valve being loaded in closing direction by a pressure in the main flow path upstream the measuring motor and downstream the main orifice ($A_1$).

18. The steering arrangement according to claim 4, wherein a safety valve is arranged in the amplification flow path, said safety valve being loaded in closing direction by a pressure in the main flow path upstream the measuring motor and downstream the main orifice ($A_1$).

19. The steering arrangement according to claim 5, wherein a safety valve is arranged in the amplification flow path, said safety valve being loaded in closing direction by a pressure in the main flow path upstream the measuring motor and downstream the main orifice ($A_1$).

20. The steering arrangement according to claim 6, wherein a safety valve is arranged in the amplification flow path, said safety valve being loaded in closing direction by a pressure in the main flow path upstream the measuring motor and downstream the main orifice ($A_1$).

* * * * *